United States Patent
Miyake et al.

[11] Patent Number: 6,133,180
[45] Date of Patent: Oct. 17, 2000

[54] CERAMIC COMPOSITE PARTICLE AND PRODUCTION METHOD THEREOF

[75] Inventors: Kazumi Miyake; Yuuji Miki; Kazuyuki Yamada, all of Saitama-ken, Japan

[73] Assignee: Honda Giken Kogyo Kabushiki Kaisha, Tokyo, Japan

[21] Appl. No.: 09/103,571

[22] Filed: Jun. 24, 1998

[30] Foreign Application Priority Data

Aug. 1, 1997 [JP] Japan .................................. 9-219791

[51] Int. Cl.⁷ .................................. C04B 35/52
[52] U.S. Cl. .................................. 501/92; 501/88; 501/89; 501/96.1; 501/97.1; 501/97.2
[58] Field of Search .................... 501/88, 89, 92, 501/96.1, 97.1, 97.2

[56] References Cited

U.S. PATENT DOCUMENTS

| | | | |
|---|---|---|---|
| 5,352,641 | 10/1994 | Matsui et al. | 501/97.4 |
| 5,468,697 | 11/1995 | Yamaguchi et al. | 501/98.4 |
| 5,525,556 | 6/1996 | Dunmead et al. | 501/97.1 |
| 5,616,527 | 4/1997 | Kita et al. | 501/97.2 |
| 5,643,843 | 7/1997 | Dunmead et al. | 501/97.1 |
| 5,648,028 | 7/1997 | Miyake et al. | 264/647 |
| 5,767,025 | 6/1998 | Miyake et al. | 501/97.1 |
| 5,902,761 | 5/1999 | Oda et al. | 501/97.1 |
| 5,912,200 | 6/1999 | Miyake et al. | 501/97.1 |

FOREIGN PATENT DOCUMENTS

| | | | |
|---|---|---|---|
| 2-160669 | 6/1990 | Japan | C04B 35/58 |
| 3-261611 | 11/1991 | Japan | C01B 21/068 |

*Primary Examiner*—Karl Group
*Attorney, Agent, or Firm*—Sughrue, Mion, Zinn, Macpeak & Seas, PLLC

[57] ABSTRACT

A ceramic composite particle having an average particle size of 0.1–120 $\mu$m, which comprises uniformly dispersed fine ceramic particle phases and a binder phase. The fine ceramic particle phases, each having a particle size of 1 nm to 1 $\mu$m and comprising a ceramic primary particle, are bound together through the binder phase which is formed by a reaction between a sintering aid and a ceramic particle. The ceramic composite particle may be produced by heat-treating a homogeneous mixture of the ceramic particle and the sintering aid until the binder phase appears. The ceramic composite particle has a good moldability and provides a highly densified sintered body with a high strength.

4 Claims, 5 Drawing Sheets

CERAMIC COMPOSITE PARTICLE AND PRODUCTION METHOD THEREOF

BACKGROUND OF THE INVENTION

The present invention relates to a ceramic composite particle and a production method thereof, in particular, to a ceramic composite particle having a homogeneous microstructure of fine ceramic particle phases and a binder phase which is formed by a reaction between a ceramic particle and a sintering aid and a method for producing such a ceramic composite particle. The ceramic composite particle has good moldability and is very suitable for producing a densified sintered body having a fine and homogenous crystal structure.

Ceramic sintered bodies of silicon nitride, etc., have been expected to be satisfactory for structural applications under severe conditions due to their high mechanical strength, high heat resistance, high thermal shock resistance and high abrasion resistance. Generally, a densified sintered body in which the fine ceramic particle phase of silicon nitride, etc., is uniformly dispersed may be considered to be obtainable from a starting ceramic powder finely pulverized. However, a ceramic powder having a particle size nano-meter order has an excessively large specific surface area and is bulky to result in a poor moldability.

For example, when a fine ceramic powder having an average particle size of nano meter order is injection molded under a low pressure, a large amount of binder for wetting the surface of individual ceramic particles is required to prepare a compound having an optimum viscosity. In the case of a slip casting method, a large amount of solvent is required to prepare a slurry having a suitable viscosity. For these reasons, a preform (green body) obtained from the fine ceramic powder having an average particle size of nanometer order has only a small density and is difficult to be densified. Therefore, to obtain a densified sintered body, the preform must be sintered while directly compressing the preform as in a hot press method, etc. However, such a direct compressing method limits the choice of the shapes of the sintered body.

Since the ceramic powder of silicon nitride, etc., is a difficult-to sinter material, the ceramic powder is sintered usually in the presence of a sintering aid such as $Y_2O_3$, $Al_2O_3$, etc., to densify the sintered body. However, it is difficult to uniformly disperse the components by merely mixing the sintering aid with the ceramic powder. The nonuniform powder mixture will result in segregation of the components in the sintered body, in particular, the segregation of the sintering aid makes the microstructure of the sintered body nonuniform.

To improve the physical properties of the ceramic sintered body, it has been proposed to obtain a composite sintered body by sintering a preform formed from a composite powder prepared by mixing a plurality of different ceramic components and heat-treating the resultant mixture. For example, to improve the properties of the silicon nitride ceramic body, various ceramic components have been used. Of these ceramic components, silicon carbide has been preferably used because of its ability of exhibiting a good oxidation resistance, a high-temperature strength and a high mechanical strength. However, a sintered body obtained from a mere mixture of silicon nitride and silicon carbide hardly has a microstructure in which the components are uniformly dispersed, and includes segregation of the components. Therefore, various methods have been proposed to produce a sintered body having a microstructure in which a silicon carbide particle is finely dispersed in the silicon nitride phase.

Japanese Patent Laid-Open No. 2-160669 discloses a silicon nitride-silicon carbide composite sintered body having a microstructure in which silicon carbide having an average particle size of 1 $\mu$m or less is dispersed in a grain boundary of silicon nitride and fine silicon carbide particles having a particle size from several nano- meters to several hundred nanometers are dispersed in silicon nitride particles. The composite sintered body is produced by a liquid phase sintering of an amorphous silicon nitride-silicon carbide composite powder or a silicon nitride-silicon carbide powder mixture, each being capable of forming fine silicon carbide having an average particle size of 0.5 $\mu$m or less during the liquid phase sintering, at 1500–2300° C. in the presence of a sintering aid which forms a liquid phase during the liquid phase sintering process. However, the starting powders are bulky and have a poor moldability due to their small particle sizes. Also, it is required for obtaining a densified sintered body to directly compress a preform during the sintering process as in the hot press method, etc. This limits the choice of the shapes of the sintered body.

Japanese Patent Laid-Open No. 3-261611 discloses a method of producing a silicon nitride composite powder for producing a silicon nitride-silicon carbide composite sintered body. The method is characterized by simultaneous carbonizing and nitriding reactions of a metallic Si powder. The simultaneous carbonizing and nitriding reactions are caused by heating a powder mixture of the metallic Si powder and a carbonaceous powder at 1400° C. or below in an inert gas atmosphere containing nitrogen. It is taught that the composite powder produced by the disclosed method has a nano composite structure having a disperse phase of nanometer order. However, since the composite powder is very fine in its particle size, the preform of the composite powder has a low density. In addition, since the composite powder contains no sintering aid, the composite powder is mixed with a sintering aid prior to the sintering process. Therefore, the microstructure of the resultant sintered body is not satisfactorily homogeneous due to the nonuniform dispersion in the starting powder mixture of the sintering aid and the composite powder. Further, since the metallic Si powder is nitrided in the absence of a sintering aid, the silicon nitride formed in the composite powder is likely to be in the form of the β-phase, which deteriorates the sinterability of the composite powder.

OBJECT AND SUMMARY OF THE INVENTION

Accordingly, an object of the present invention is to provide a ceramic composite particle having a good moldability and being suitable for producing a highly densified sintered body having a high strength due to its microstructure in which fine ceramic particles are uniformly dispersed, and to provide a method of producing such a ceramic composite particle.

As a result of the intense research in view of the above objects, the inventors have found that a ceramic composite particle in which fine ceramic particle phases having a particle size of nano- meter order are bound together through a binder phase formed by a reaction between a fine particle of a ceramic material and a sintering aid has a microstructure in which the fine ceramic particles are uniformly dispersed. The inventors have further found that the above ceramic composite particle has a good moldability and is capable of providing a homogeneous and highly densified sintered body. The present invention has accomplished based on these findings.

Thus, in a first aspect of the present invention, there is provided a ceramic composite particle having an average particle size of 0.1–120 μm, which comprises a plurality of fine ceramic particle phases and a binder phase formed by a reaction between a fine particle of at least one ceramic material and a sintering aid, each of the fine ceramic particle phases comprising a fine primary particle of at least one ceramic material and having a particle size in the range of 1 nm to 1 μm, and the fine ceramic particle phases being bound together through the binder phase. Since the ceramic composite particle of the present invention is subjected, during the production thereof, to an initial stage of a sintering process for producing a sintered body, the preform of the ceramic composite particle is easily densified during the sintering process in a shorter period of time as compared with sintering a powder mixture of a ceramic fine particle and a sintering aid as employed in a known method. Therefore, the ceramic composite particle of the present invention is particularly suitable for producing a sintered body by a sintering process under a condition making the sintering components unstable, for example, a sintering process for producing a silicon nitride-silicon carbide composite sintered body at a high temperature under a high nitrogen pressure. Under such conditions, silicon carbide is likely to become unstable.

In a second aspect of the present invention, there is provided a method of producing the above ceramic composite particle, which comprises the steps of (1) preparing a homogeneous powder mixture of the fine particle of at least one ceramic material and the sintering aid; and (2) heat-treating the homogeneous powder mixture at 1200–1500° C. until the binder phase is formed by a reaction between the sintering aid and the fine particle of at least one ceramic material.

In a third aspect of the present invention, there is provided a method of producing the above ceramic composite particle, which comprises the steps of (1) preparing a homogeneous powder mixture of a silicon powder, a carbonaceous powder and the sintering aid; (2) heat-treating the homogeneous powder mixture in a nitrogen containing atmosphere at 1450° C. or lower to simultaneously cause nitriding and carbonizing reactions of silicon; and (3) continuously heat-treating the homogeneous powder mixture at a temperature 10–100° C. higher than the nitriding and carbonizing temperature until the binder phase is formed by a reaction between the sintering aid and silicon nitride formed by the nitriding reaction of silicon.

DETAILED DESCRIPTION OF THE INVENTION

[1] Microstructure of Ceramic Composite Particle

Figure 1:
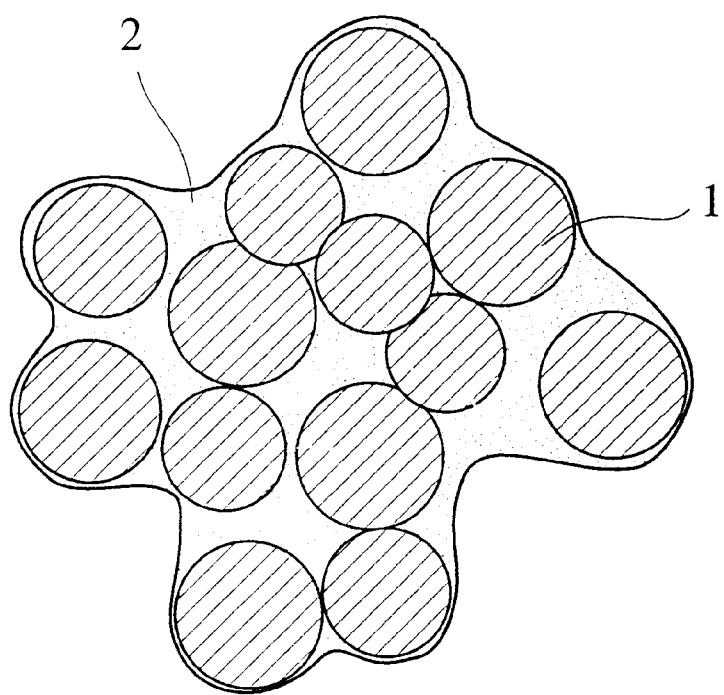
FIG. 1 is a schematic illustration showing the microstructure of the ceramic composite particle of the present invention.

The ceramic composite particle of the present invention comprises a plurality of fine ceramic particle phases comprising a fine primary particle of at least one ceramic material and a binder phase formed by a reaction between a ceramic particle and a sintering aid. The binder phase binds the fine ceramic particle phases to each other. An example of the microstructure of the ceramic composite particle is schematically shown in FIG. 1, in which the reference numeral 1 is the fine ceramic particle phase and the reference numeral 2 is the binder phase.

(1-a) Fine Ceramic Particle Phase

The fine ceramic particle phase may be referred to as a primary particle phase comprising a fine primary particle of a ceramic material. The ceramic material, partly constituting the fine ceramic particle phase and partly constituting the binder phase, is at least one of silicon nitride, silicon carbide, titanium nitride, etc. Since silicon nitride has a high strength, a high heat resistance, a high thermal shock resistance, a high abrasion resistance, etc., and silicon carbide has an ability of exhibiting a good oxidation resistance, a good high-temperature strength and a high mechanical strength, a sintered body made from a ceramic composite particle containing silicon nitride and silicon carbide can be suitably used as a high strength structural member and sliding member.

For example, when a ceramic composite particle containing silicon nitride and silicon carbide is sintered, the resultant composite sintered body has a so-called nano composite structure where fine silicon carbide particles are dispersed in silicon nitride particles and grain boundaries thereof. Since the silicon carbide particles have a larger thermal expansion coefficient than the silicon nitride particles, the silicon carbide particles exert a residual stress to the silicon nitride particles at high temperatures, thereby improving the high-temperature strength. Further, the fine silicon carbide particles dispersed in the grain boundaries of the silicon nitride suppress the anomalous growth of silicon nitride grains and prevent the structure of the sintered body from becoming coarse. Also, such dispersed fine silicon carbide particles function as wedges to suppress the sliding of the silicon nitride particles along the grain boundaries, thereby improving the high-temperature strength and creep characteristics.

When the weight ratio of silicon carbide/silicon nitride is too small, a sufficient effect of adding silicon carbide cannot be obtained. When the weight ratio of silicon carbide/silicon nitride is too large, a large amount of the dispersed fine silicon carbide prevents the densification of silicon nitride, thus failing to obtain a sintered body having a sufficiently large density. Therefore, the weight ratio of silicon carbide/silicon nitride in the fine ceramic particle phases is preferably 5/95 to 50/50, and more preferably 15/85 to 40/60.

The particle size of each fine ceramic particle phase distributes within the range preferably from 1 nm to 1 μm, more preferably form 10 nm to 500 nm. When the particle size is larger than 1 μm, a homogeneous sintered structure due to fine primary particles cannot be attained. A particle having a particle size less than 1 nm is technically difficult to produce.

(1-b) Binder Phase

The binder phase is a reaction product between the sintering aid and the ceramic particle such as silicon nitride, silicon carbide, titanium nitride, etc., as mentioned above.

As will be mentioned below, the sintering aid may be (i) at least one oxide of MgO, $Al_2)_3$, etc., (ii) at least one oxide selected from the group consisting of oxides of 3A and 4A Group elements of the Periodic Table, or (iii) a mixture of aluminum nitride and at least one oxide of (i) or (ii). For example, when silicon nitride is used as the ceramic material alone or in combination with silicon carbide and yttrium oxide is used as the sintering aid, a binder phase comprising a Y—Si—O—N phase ($Y_5N(SiO_4)_3$, for example, is formed.

The formation of the binder phase may be confirmed by X-ray diffractometry, a composition analysis (energy dispersive spectroscopy (EDS) analysis) of a sample for TEM observation, etc. When confirming by X-ray diffractometry, the presence of peaks based on the reaction product ($Y_5N(SiO_4)_3$, for example, of the ceramic particle and the sintering aid is examined on the X-ray diffraction pattern. In the ceramic composite particle of the present invention, the sintering aid reacts with the ceramic particle to form the binder phase in which the sintering aid is uniformly dispersed. Therefore, a sintered body obtained by sintering the ceramic composite particle is free from a problem of the nonuniform microstructure due to segregation of the sintering aid.

[2] Starting Material

The ceramic composite particle of the present invention is produced by heat-treating a homogeneous powder mixture comprising (I) the fine ceramic particle of at least one ceramic material and the sintering aid; (II) a precursor of the ceramic material and the sintering aid; or (III) the precursor of the ceramic material, the fine ceramic particle of at least one ceramic material and the sintering aid. The precursor referred to herein is a substance which is converted to the ceramic material such as silicon nitride, silicon carbide, titanium nitride, etc., by a heat treatment.

The starting powder mixture (I) is heat-treated to obtain the ceramic composite particle of the present invention. The ceramic particle may either crystalline or amorphous. In the starting powder mixture of (II) or (III), the precursor of the ceramic material may include a metallic component such as silicon, etc., and a non-metallic component such as a carbonaceous powder. The starting powder mixture of (II) or (III) is heat-treated in an atmosphere such as a nitriding atmosphere to allow the metallic component to react with the non-metallic component and/or a reactive component in the atmosphere, and thereby converted to the ceramic material which then forms the fine ceramic particle phase and reacts with the sintering aid to form the binder phase. Thus, the starting powder mixture of (II) or (III) is made into the ceramic composite particle by a so-called reaction sintering. The reaction sintering may be carried out by vapor phase reaction, liquid phase reaction, solid state reaction, CVD, etc., as employed in the art.

(2-a) Starting Powder Mixture (I)

The starting powder mixture (I) consists essentially of the ceramic powder of at least one ceramic material such as silicon nitride, silicon carbide, etc., and a sintering aid.

(2-a1) Silicon Nitride Powder

The average particle size of the silicon nitride powder is preferably 1 nm to 1 $\mu$m, more preferably 10 nm to 0.5 $\mu$m in view of obtaining a ceramic composite particle having a good moldability.

(2-a2) Silicon Carbide Powder

To enhance the oxidation resistance, high-temperature strength and mechanical strength, the silicon carbide powder may be used in addition to silicon nitride. The weight ratio of silicon carbide/silicon nitride is preferably 5/95 to 50/50, more preferably 15/85 to 40/60. The average particle size of the silicon carbide powder is preferably 1 nm to 1 $\mu$m, more preferably 10 nm to 0.5 $\mu$m.

(2-a3) Sintering Aid

The sintering aid usable in the present invention is (i) at least one oxide of MgO, $Al_2O_3$, etc., (ii) at least one oxide selected from the group consisting of oxides of 3A and 4A Group elements of the Periodic Table, or (iii) a mixture of aluminum nitride and at least one oxide of (i) or (ii). The oxides of 3A and 4A Group elements may be $Y_2O_3$, $L_2O_3$, $Yb_2O_3$, $HfO_2$, $ZrO_2$, etc. If a sintered body for a high strength member at high temperatures is intended, the use of $Y_2O_3$ alone is preferable. A combined use of $Y_2O_3$ and $Al_2O_3$ is preferable to obtain a sintered body for a high strength member at low temperatures. Instead of using the above oxides, the sintering aid may be used in the form of a precursor, such as a corresponding alkoxide and a corresponding oxalate, which is converted to the oxides during the heat treatment, etc.

The amount of the sintering aid is preferably 5–20 weight %, more preferably 7–15 weight % based on the amount of the ceramic composite particle. If the amount is less than 5 weight %, the sinterability of the resultant ceramic composite particle becomes insufficient. An amount exceeding 20 weight % reduces the high temperature strength of a sintered body obtained by the ceramic composite particle.

The average particle size of the sintering aid is not strictly limited, but is usually 10 nm to 5 $\mu$m.

(2-b) Starting Powder Mixtures (II) and (III)

The starting powder mixtures (II) and (III) consist essentially of the precursor of the ceramic material such as a silicon powder, a carbonaceous powder, etc., the sintering aid and an optional ceramic powder of silicon nitride, silicon carbide, etc.

(2-b1) Silicon Powder

The average particle size of the silicon powder used in the present invention is preferably 0.2–20 $\mu$m, and more preferably 0.3–10 $\mu$m. When the average particle size is less than 0.2 $\mu$m, the oxidation of the surface of the silicon powder becomes significant. An average particle size exceeding 20 $\mu$m is undesirable because the silicon powder is difficult to be uniformly dispersed and the reactivity of the silicon powder with a carbonaceous powder and a nitriding gas is lowered. The silicon powder with such an average particle size may be selected from a wide range of materials from a relatively low purity, cheap powder as specified in JIS G 2312 to a high purity powder obtained by pulverizing a scrap of silicon wafer from semiconductor production. When a high purity silicon powder is used, Fe, Cr, Co, etc., may be added in the form of a metal or compound to promote the carbonizing and nitriding reactions of silicon.

The amount of the silicon powder in the starting powder mixture is preferably 80–98 weight %, more preferably 84–94 weight % based on the total amount of the silicon powder and the carbonaceous powder. When the amount is less than 80 weight %, the resultant ceramic composite particle does not provide a sintered body with a sufficient density. When the amount exceeds 98 weight %, the effect of silicon carbide is not attained sufficiently.

(2-b2) Carbonaceous Powder

The carbonaceous powder is not strictly limited as far as the powder is fine, and preferably a powder of graphite and carbon black such as acetylene black, KETJEN black, etc. The average particle size of the carbonaceous powder is preferably 20 $\mu$m or less, more preferably 10 $\mu$m or less. A powder having an average particle size larger than 20 $\mu$m is difficult to be uniformly dispersed.

The amount of the carbonaceous powder in the starting powder mixture is preferably 2–20 weight %, more preferably 6–16 weight % based on the total amount of the silicon powder and the carbonaceous powder. When the amount is more than 20 weight %, the resultant ceramic composite particle does not provide a sintered body with a sufficient density. When the amount is less than 2 weight %, the effect of silicon carbide is not attained sufficiently.

(2-b3) Silicon Nitride Powder

To impart a good moldability to the ceramic composite particle and serve as a nucleus for forming silicon nitride by nitriding the silicon powder, an amount of silicon nitride powder as mentioned above may be further used. The addition amount of the silicon nitride powder is preferably 0–10 weight %, more preferably 0–5 weight % based on the total amount of the silicon nitride formed from the silicon powder by the heat treatment and the silicon nitride being added. When the addition amount of the silicon nitride powder is too large, namely, the ratio of the silicon nitride powder to the silicon powder is excessively large, the reaction sintering of silicon becomes insufficient and the intended results cannot be attained.

(2-b4) Silicon Carbide Powder

In addition to the silicon nitride powder, the same silicon carbide powder as mentioned above may be used in a small amount to impart a good moldability to the ceramic composite particle and serve as a nucleus for forming silicon carbide by a reaction between the silicon powder and the carbonaceous powder. The addition amount of the silicon carbide powder is preferably 0–10 weight %, more preferably 0–5 weight % based on the total amount of the silicon carbide formed from the silicon powder and the carbonaceous powder by the heat treatment and the silicon carbide being added. When the addition amount of the silicon carbide powder is too large, the reaction sintering of silicon becomes insufficient and the intended results cannot be attained.

(2-b5) Sintering Aid

The same sintering aid may be used in the same addition amount range as in the starting powder mixture (I).

The sintering aid is mixed with the precursor of the ceramic material (silicon powder and carbonaceous powder) and then the mixture is subjected to nitriding and carbonizing treatment. By such a treatment after mixing, the amount of α-silicon nitride in the resultant ceramic composite particle is increased and the sintering aid reacted with the ceramic material resulting from the precursor to form the binder phase. Therefore, the resultant ceramic composite particle has an extremely homogeneous structure with no segregation of the sintering aid, this making the microstructure of a composite sintered body produced from the ceramic composite particle homogeneous and improving the mechanical strength of the composite sintered body.

[3] Production Method of Ceramic Composite Particle

The starting powder mixture (I) is made into the ceramic composite particle by a first production method, and the starting powder mixtures (II) and (III) by a second production method.

(3-a) First Production Method (3-a1) Preparation of Starting Mixture

The components for the starting powder mixture (I) are thoroughly dry- or wet-blended in a ball mill, kneader, etc. In a wet blending, an organic solvent such as ethanol, butanol, etc., is added to the powder mixture as a dispersion medium. In addition to the dispersion medium, a suitable organic or inorganic binder may be added. As the organic binder, exemplified are ethyl silicate, polyethylene glycol, polyvinyl alcohol (PVA), acrylic emulsion, polyurethane emulsion, etc.

(3-a2) Heat Treatment

The starting mixture is then subjected to a heat treatment at 1200–1500° C. until the binder phase appears by the reaction between the sintering aid and the ceramic particle. The appearance of the binder phase can be easily confirmed by X-ray diffractometry, EDS analysis, as described above.

(3-a3) Pulverization

Since the as-produced ceramic composite particle thus obtained is somewhat coarse in size due to aggregation, the as produced ceramic composite particle is usually pulverized or crushed in a ball mill, vibrating mill, jet mill, attrition mill, etc., to have an average particle size of 0.1–120 $\mu$m, preferably 0.1–10 $\mu$m. A ceramic composite particle having an average particle size less than 0.1 $\mu$m has a large specific surface area and is so bulky that the moldability thereof is poor. When the average particle size is larger than 120 $\mu$m, the ceramic composite particle is very difficult to be made into a self-supporting preform.

(3-b) Second Production Method (3-b1) Preparation of Starting Mixture

The precursor of the ceramic material, the sintering aid and the optional ceramic particle are blended in the same manner as in the first production method to prepare a homogeneous starting mixture (II) or (III).

(3-b2) Heat Treatment

Each starting mixture is subjected to a heat treatment at 1450° C. or lower in a nitrogen-containing atmosphere to simultaneously cause the nitriding reaction and the carbonizing reaction of silicon, and then continuously heated to a temperature 10–100° C. higher than the nitriding/carbonizing temperature and maintained there until the binder phase appears by the reaction between the sintering aid and the silicon nitride formed by the nitriding reaction of silicon. The heat treatment for forming silicon nitride and silicon carbide by a reaction sintering method and the heat treatment for forming the binder phase will be described in more detail.

A powder mixture mainly comprising the silicon powder, carbonaceous powder and sintering aid powder is heated in a nitrogen-containing atmosphere to nitride and carbonize the silicon powder simultaneously. The nitriding rate and the carbonizing rate of the silicon powder depend on the carbon amount in the starting mixture. Since substantially all part of carbon reacts with silicon to form silicon carbide, substantially all the silicon remaining unreacted with the carbon is converted into silicon nitride. For example, if a molar ratio of silicon and carbon in the starting mixture is 100:7, the molar ratio of the formed silicon nitride ($Si_3N_4$) and silicon carbide (SiC) is 31:7.

Although the heat-treatment condition for the simultaneous nitriding and carbonizing reactions depends on the composition of the starting mixture to some extent, the temperature is usually 1450° C. or lower. When the starting mixture is heated to a temperature higher than 1450° C. during the nitriding and carbonizing treatment, unfavorable elution and vaporization of silicon occur. The lower limit of the nitriding and carbonizing temperature is preferably 1000° C., more preferably 1200° C. The nitriding and carbonizing reactions are not initiated, or proceed very slowly, at a temperature lower than 1000° C. A preferred nitriding and carbonizing temperature range is 1200–1400° C.

When the temperature approaches nearer the nitriding temperature, the starting powder is preferably heated at a lower rate. Specifically, when the atmospheric temperature reaches at 900–1300° C., the temperature rise rate is lowered preferably less than 2° C./min, more preferably 1° C./min or less, and particularly preferably 0.5° C./min. When the temperature rising rate is 2° C./min or more, the rate of nitriding reaction is too high and the content of α-silicon nitride in the resultant ceramic composite particle is reduced, this resulting in a poor moldability of the ceramic composite particle. The content of α-silicon nitride is preferably 30% or more, more preferably 40% or more based on the silicon nitride in the ceramic composite particle when measured by X-ray diffraction.

The pressure of the nitrogen-containing atmosphere is preferably 1 kgf/cm$^2$ or higher, more preferably 5–2000 kgf/cm$^2$. The nitriding reaction does not proceed sufficiently when the pressure is lower than 1 kgf/cm$^2$. Although somewhat dependant on the nitriding and carbonizing temperature, the nitriding and carbonizing time is preferably 1–10 hours. The nitrogen-containing atmosphere referred to herein is an atmosphere comprising a nitrogen-containing gas such as nitrogen gas, a mixed gas of nitrogen, hydrogen, ammonia, etc., a mixed gas of nitrogen and an inert gas such as argon and helium, etc.

After completion of the nitriding and carbonizing treatment, the heat treatment is further continued at a temperature 10–100° C. higher than the nitriding and carbonizing temperature and within the range of 1200–1500° C. During such a continued heat treatment, the sintering aid reacts with silicon nitride to form the binder phase.

When the temperature is not higher than the nitriding and carbonizing temperature by 10° C. or more, a part of the sintering aid remains unreacted. When the temperature is higher than the nitriding and carbonizing temperature over 100° C., the ceramic particle phase grows excessively to fail to obtain a ceramic composite particle having a fine ceramic particle phase.

The heat treatment for forming the binder phase is conducted by raising the temperature after the completion of the nitriding and carbonizing treatment at a nearly constant temperature. Alternatively, the nitriding and carbonizing treatment and the formation of the binder phase may be continuously carried out while continuously raising the temperature during both the heat treatments. The formation of the binder phase can be easily confirmed by X-ray diffractometry, EDS analysis, etc., as described above.

(3-b3) Pulverization

The ceramic composite particle thus produced is pulverized or crushed, if necessary, in the same manner as in the first production method to obtain the ceramic composite particle having an average particle size of 0.1–120 µm, preferably 0.1–10 µm.

Since the conventionally known aggregated powder and granulated powder has a structure in which respective particles are loosely combined, the aggregated powder and the granulated powder are likely to be broken to respective fine ceramic particles (primary particles) during the dispersion treatment for preparing a slurry, kneading treatment, etc. The fine primary particles are very difficult to be uniformly mixed, and result in failure to provide a sintered body having a homogeneous structure. Unlike the conventional aggregated powder and granulated powder, the ceramic composite particle of the present invention has a structure in which respective fine primary particles (fine ceramic particle phases) are strongly combined through the binder phase. Therefore, the ceramic composite particle is not broken to respective fine primary particles during the dispersion treatment, kneading treatment, etc. Thus, by using the ceramic composite particle of the present invention, a homogeneous structure of the dispersed fine ceramic particles can be attained while avoiding the problem involved in directly sintering the fine ceramic particles.

[4] Preparation of Preform

The ceramic composite particle of the present invention may be made into a preform (green body) by a press molding, an injection molding, a slip casting, etc. A preform having a complicated shape is preferably molded by the injection molding and the slip casting.

(4-a) Injection Molding

The ceramic composite particle is added with an organic binder and kneaded in a kneader, etc., to prepare an injection molding compound. Since the ceramic composite particle is not pulverized to respective primary particles during the kneading process, the amount of the binder required for optimizing the viscosity of the compound largely depends on the particle size and the packing efficiency of the ceramic composite particle. A ceramic composite particle having a small particle size and a poor packing efficiency requires a large amount of the binder. A ceramic composite particle having a relatively large particle size and a good packing efficiency provides a flowable compound by a small addition amount of the binder. The ceramic composite particle of the present invention contains the fine ceramic particle phases having a quite small particle size. However, since the amount of the binder required for preparing an optimum compound depends on the particle size of the ceramic composite particle, an excessively large amount of the binder is not required in the present invention. Therefore, the preform after degreasing has a high density and exhibits a small shrinkage during the sintering process.

The organic binder may be paraffin, wax, ethylene-vinyl acetate copolymer (EVA), polyethylene (PE), stearic acid, polypropylene (PP), butyl stearate, oleic acid, polyethylene glycol (PEG), maleic wax, etc.

(4-b) Slip Casting

In the slip casting, a slurry is first prepared by adding a solvent containing a dispersant to the ceramic composite particle and kneading the resultant mixture in a ball mill, etc. Since the fine ceramic particle phases are bound together by the binder phase, the amount of the solvent does not depend on the size of the fine ceramic particle phase, and only a small amount enough to wet the surface of the ceramic composite particle is satisfactory. Therefore, the required amount of the solvent is small in the present invention although the fine ceramic particles (fine ceramic particle phases) are used. This results in a high density of a preform after degreasing and a small shrinkage of the preform during the sintering process.

[5] Sintering of Preform

The preform made of the ceramic composite particle of the present invention may be sintered by a known method such as a pressureless sintering, a pressure sintering, a hot isostatic press (HIP), etc. Since the fine ceramic particle phases are very fine and uniformly dispersed in the ceramic composite particle, the microstructure of a resultant sintered body, which depends on the particle size of the starting ceramic particles, is very fine and homogeneous in the present invention. Also, since the binder phase in the ceramic composite particle is uniformly distributed between the fine ceramic particle phases, the segregation of the sintering aid can be avoided. Therefore, as compared with a conventional sintered body produced by sintering a powder mixture of a ceramic particle and a sintering aid, the sintered body produced by sintering the ceramic composite particle of the present invention has an excellent homogeneous microstructure which improves the mechanical strength of the sintered body.

The present invention will be further described while referring to the following Examples which should be con-

11 sidered to illustrate various preferred embodiments of the present invention.

EXAMPLE 1
Production of Ceramic Composite Particle 578.6 g of a silicon powder (JIS MSi No. 1; average particle size: 0.5 μm), 82.9 g of a carbon black powder (average particle size: 5 μm or less) and 80.0 g of an yttrium oxide powder (average particle size: 1.4 μm) were blended under pulverizing in a ball mill for 18 hours using 1483 g of ethanol as the dispersion medium. After drying the resultant starting mixture, the dried mixture was heated in a reaction vessel in an nitrogen-containing atmosphere. After the temperature reached 1150° C., the temperature was raised to 1230° C. at a temperature rise rate of 0.5° C./min and then maintained there for 60 minutes. After the completion of the heat treatment, the resultant product was crushed in a ball mill to obtain a ceramic composite particle having an average particle size of 0.3 μm of the present invention.

Figure 2:
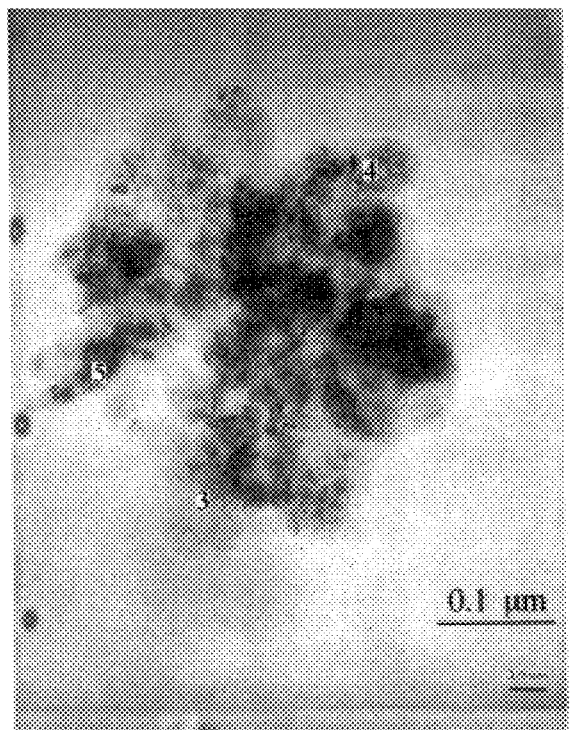
FIG. 2 is a TEM (transition electron microscope) photomicrograph (×200,000) showing the microstructure of the ceramic composite particle produced in Example 1.

The BET specific surface area of the ceramic composite particle was 10 m$^2$/g. The result of TEM observation on the microstructure of the ceramic composite particle showed that the ceramic composite particle having a particle size of several hundreds of nm was constituted by the fine ceramic particle phases having a particle size of several tens of nm which were bound together through the binder phase. A TEM photomicrograph is shown in FIG. 2, in which reference numeral 3 is a phase consisting of Y—Si—O—N and Si—C (binder phase), reference numeral 4 is Si—N—O phase (fine ceramic particle phase), and reference numeral 5 is β-SiC crystal phase (fine ceramic particle phase).

From EDS spectrum and restricted-field electron diffraction pattern of the sample for TEM observation, the presence of β-SiC crystal phase, Si—N crystal phase and Y—Si—O—N binder phase was confirmed. Further, X-ray diffraction pattern showed the peak based on Y$_5$N(SiO$_4$)$_3$ phase. From the above results, it was confirmed that the silicon powder was converted to silicon nitride and silicon carbide by the heat treatment, and that the sintering aid reacted with silicon nitride and to form the binder phase substantially comprising Y—Si—ON.

The surface of a compact body of the ceramic composite particle was subjected to a surface analysis by electron probe micro analysis (EPMA) to examine the distribution of Y atoms and O atoms. The results showed that Y atoms and O atoms were present in different portions and Y atoms were nearly uniformly dispersed throughout the measured surface. This teaches that the sintering aid (Y$_2$O$_3$) reacted with the fine ceramic particle (Si$_3$N$_4$ and SiC) and was dispersed within the ceramic composite particle uniformly.

EXAMPLE 2
Production of Preform by Low-Pressure Injection Molding

The ceramic composite particle produced in Example 1 was added with an organic binder (stearic acid : paraffin dispersant =10:85:5 (by volume %)) to prepare a compound. The amount of the binder required for obtaining an optimum viscosity was 45 volume % based on the total volume of the ceramic composite particle and the organic binder. The compound thus prepared was subjected to a low pressure injection molding to obtain a preform having a relative density of 58%. This result shows that the ceramic composite particle of the present invention can provide a preform having a sufficient density by a low-pressure injection molding with the use of a relatively small amount of the organic binder.

EXAMPLE 3
Production of Preform by Slip Casting 100 parts by weight of the ceramic composite particle produced in Example 1, 0.2 part by weight, based on the effective ingredients, of a dispersant (SNEX Dispersant) and 42 parts by weight of water were blended in a ball mill to prepare a slurry. The slurry was slip cast in a plaster mold to obtain a preform having a relative density of 57%. This result shows that the ceramic composite particle of the present invention can provide a preform having a sufficient density by slip casting with the use of a relatively small amount of the solvent.

COMPARATIVE EXAMPLE 1

A compound was prepared in the same manner as in Example 2 except for using a silicon carbide fine powder (average particle size: 0.03 μm; BET specific surface area: 50.3 m$^2$/g) having an average particle size comparable to that of the fine ceramic particle phase in the ceramic composite particle of the present invention. The amount of the binder required for obtaining an optimum viscosity was 80 volume % based on the total volume of the silicon carbide fine powder and the organic binder. The compound was subjected to a low-pressure injection molding to obtain a preform. However, the preform after degreasing failed to support its shape due to an extremely low density.

COMPARATIVE EXAMPLE 2

A slurry was prepared in the same manner as in Example 3 except for using the silicon carbide fine powder used in Comparative Example 1. Since the slurry showed no flowability, another slurry was prepared by increasing the amounts of water and the dispersant to 105 parts by weight and 0.5 part by weight (effective ingredients basis) each based on 100 parts by weight of the silicon carbide fine powder. Nevertheless, the slurry showed no flowability. Since it was predicted that the further increased amount of water would result in failure to obtain a slip cast preform with a sufficient density, the preparation of other slurries was not done.

EXAMPLE 4
(1) Production of Ceramic Composite Particle 549.8 g of a silicon powder (JIS MSi No. 1; average particle size: 0.5 μm), 78.8 g of a carbon black powder (average particle size: 5 μm or less), 80.0 g of an yttrium oxide powder (average particle size: 1.4 μm), 32.2 g of a silicon nitride powder (average particle size: 0.3 μm), 13.8 g of a silicon carbide powder (average particle size: 0.3 μm) and 1509.2 g of ethanol as the dispersion medium were blended under pulverizing in a ball mill for 18 hours using 754.6 g of silicon nitride balls as a tumbling media. After drying the resultant starting mixture, the dried mixture was heated in a reaction vessel in a nitrogen-containing atmosphere. After the temperature reached 1100° C., the temperature was raised to 1380° C. at a temperature rise rate of 0.5° C./min. After the completion of the heat treatment, the resultant product was crushed in a ball mill to obtain a ceramic composite particle having an average particle size of 1.6 μm of the present invention.

Figure 3:
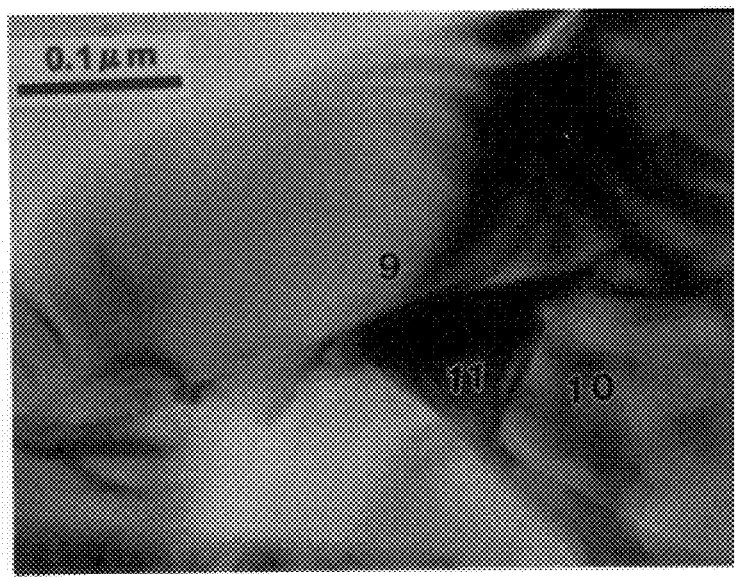
FIG. 3 is a TEM photomicrograph (×250,000) showing the microstructure of the composite particle produced in Example 4.

The BET specific surface area of the ceramic composite particle was 4.8 m$^2$/g. The result of SEM (scanning electron microscope) and TEM observation on the microstructure of the ceramic composite particle showed, like Example 1, that the ceramic composite particle having a particle size of μm order was constituted by the fine ceramic particle phases having a particle size from several tens of nm to several hundreds of nm which were bound together through the binder phase. A TEM photomicrograph is shown in FIG. 3, in which reference numeral 9 is β-$Si_3N_4$ crystal phase (fine ceramic particle phase), reference numeral 10 is β-SiC crystal phase (fine ceramic particle phase) and reference numeral 11 is Y—Si—O—N binder phase. Although β-$Si_3N_4$ crystal phase was found in FIG. 3, the content of α-$Si_3N_4$ crystal phase was confirmed to be about 60% by analyzing X-ray diffraction patterns.

Figure 4:
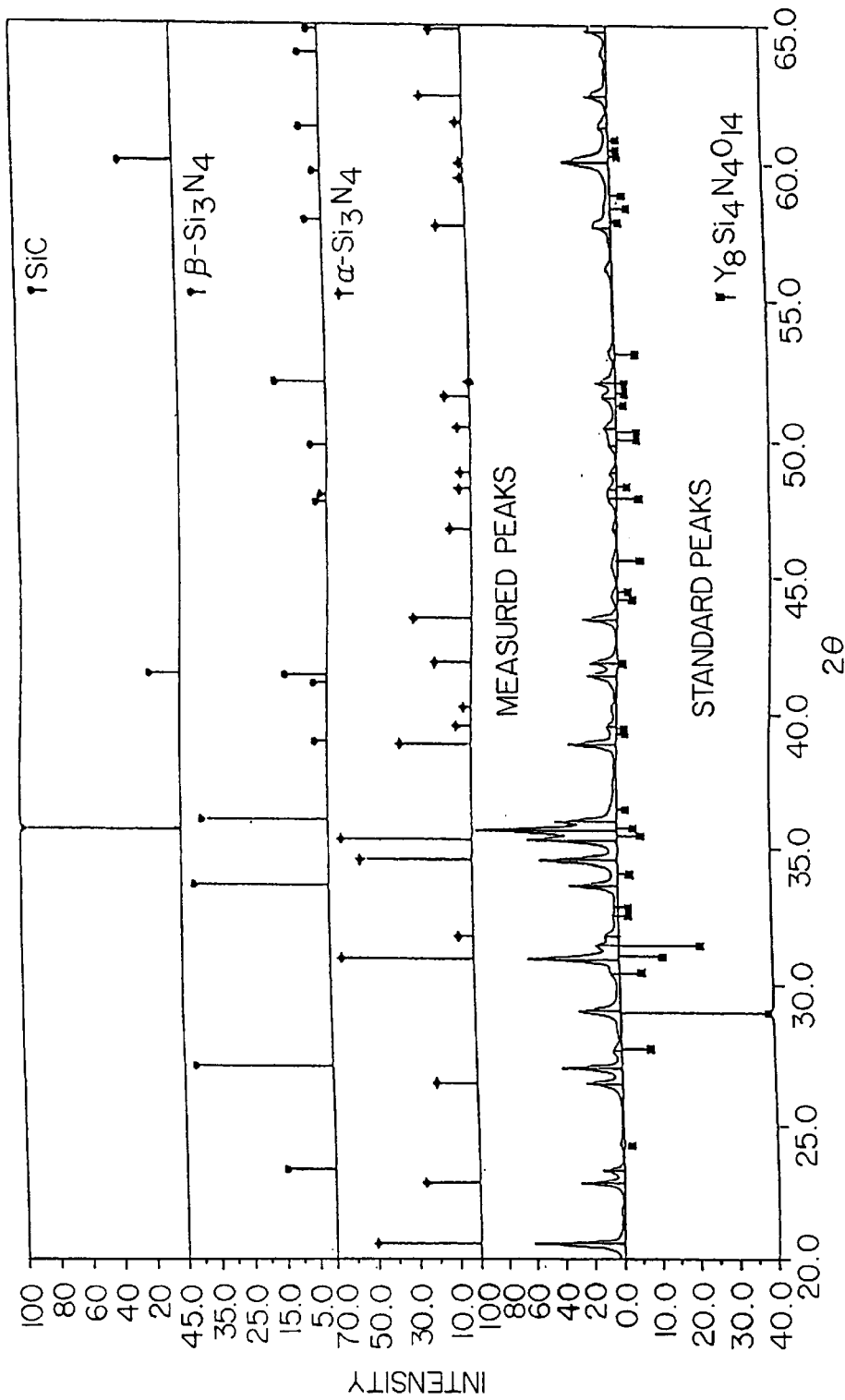
FIG. 4 is the X-ray diffraction pattern of the ceramic composite particle produced in Example 4.
Figure 5:
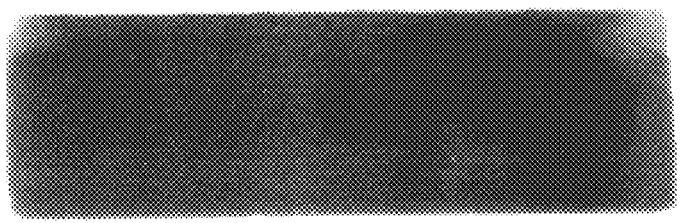
FIG. 5 is a cross-sectional photograph showing the microstructure of the composite sintered body produced in Example 4.

From EDS spectrum and restricted-field electron diffraction pattern of the sample for TEM observation, the presence of SiC crystal phase, $Si_3N_4$ crystal phase and Y—Si—O—N binder phase was confirmed. Further, X-ray diffraction pattern in FIG. 4 showed the presence of peak based on $Y_8Si_4N_4O_{14}$ phase and the absence of peaks based on silicon and carbon. From the above results, it was confirmed that the silicon powder and the carbon black powder were completely converted to silicon nitride and silicon carbide by the heat treatment, and that the sintering aid ($Y_2O_3$) reacted with silicon nitride to form the binder phase substantially comprising Y—Si—O—N.

(2) Production of Preform

The ceramic composite particle thus produced was subjected to a cold isostatic press (CIP) under a pressure of 4 tf/$cm^2$ to obtain a preform. The relative density of the preform was 54%.

(3) Production of Sintered Body

Figure 6:
FIG. 6 is a SEM (scanning electron microscope) photomicrograph (×5,000) showing a cross section of the sintered body produced in Example 4.

The above preform was sintered by hot pressing in an nitrogen-containing atmosphere at 1850° C. under a pressure of 350 kgf/$cm^2$ for 4 hours. The relative density of the resultant sintered body was 99.7%. The observation on a cross section parallel to the pressing direction showed that the microstructure of the sintered body was uniform and homogeneous. The cross section was further observed by SEM and TEM. The results showed that the sintered body had a homogeneous microstructure comprising fine crystalline particles with a particle size of submicron order. A SEM photomicrograph of the cross section is shown in FIG. 6.

(4) Properties of Sintered Body

The sintered body produced above was heat-treated at 1400° C. for one hour, and subjected to a three-point bending test according to JIS R1601. The measured three-point bending strength was 918 MPa (average of four samples).

COMPARATIVE EXAMPLE 3

(1) Production of Ceramic Powder Mixture 644 g of a silicon nitride powder (SN-E10 manufactured by Ube Industries, Ltd.; average particle size: 0.3 μm), 276 g of a silicon carbide (beta random ultrafine grade manufactured by Ibiden Co., Ltd.; average particle size: 0.27 μm), 80 g of an yttrium oxide powder (manufactured by Nippon Yttrium Co., Ltd.; average particle size: 1.4 μm) and 1000 g of ethanol as the dispersion medium were blended under pulverizing in a ball mill for 18 hours using 800 g of silicon nitride balls as a tumbling media. The resultant mixture was dried to obtain a starting ceramic powder mixture having a BET specific surface area of 12.1 $m^2$/g. The above amounts, 644 g of silicon nitride and 276 g of silicon carbide, correspond to theoretical amounts of silicon nitride and silicon carbide formed from 578.6 g of silicon and 82.9 g of carbon black used in Example 1.

The surface of a compact body of the ceramic powder mixture was subjected to a surface analysis by EPMA to examine the distribution of Y atoms and O atoms. The results showed that Y atoms and O atoms were present in nearly the same portions, and the segregation of the sintering aid ($Y_2O_3$) was found on the measured surface.

(2) Production of Sintered Body

Figure 7:
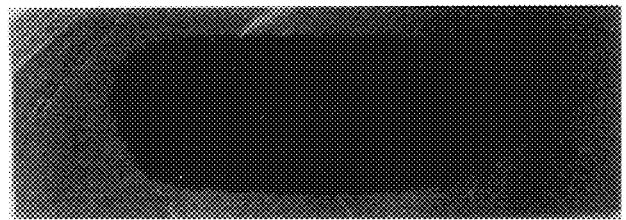
FIG. 7 is a cross-sectional photograph showing the microstructure of the composite sintered body produced in Comparative Example 3.

A preform of the ceramic powder mixture was produced in the same manner as in Example 4. The preform thud obtained was sintered by hot pressing in a nitrogen-containing atmosphere at 1850° C. under a pressure of 350 kgf/$cm^2$ for 4 hours. The relative density of the resultant sintered body was 97.9%. The observation on a cross section parallel to the pressing direction showed, as seen from FIG. 7, the presence of a round heterogeneous portion in the center of the sintered body. As a result of X-ray diffractometry, it was found that the SiC peak from the round heterogeneous portion was weaker than usual. This suggests that the rate of densification during the sintering process was reduced due to the segregation of the sintering aid, etc., and as a result thereof, the nonsintered SiC was nitrided during the sintering in a nitriding atmosphere. Also, as seen from FIG. 7, the crack was found in the cross section, and therefore, the strength test was not made on the sintered body.

EXAMPLE 5

Production of Ceramic Composite Particle 322 g of a silicon nitride powder (SN-9S manufactured by Denka Co., Ltd.; average particle size: 0.5 μm), 138 g of a silicon carbide powder (MSC-20 manufactured by Mitsui Toatsu Chemicals, Inc.; average particle size: 0.15 μm) and 40.0 g of an yttrium oxide powder (manufactured by Nippon Yttrium Co., Ltd.; average particle size: 1.4 μm) and 500 g of ethanol as the dispersion medium were blended under pulverizing in a ball mill for 18 hours using 400 g of silicon nitride balls as a tumbling media, and then dried. The resultant powder mixture was heat-treated and crushed in the same manner as in Example 1 to obtain a ceramic composite particle having an average particle size of 3 μm. The powder mixture in the above proportion provided a ceramic composite particle having the same composition as that of Example 1.

Figure 8:
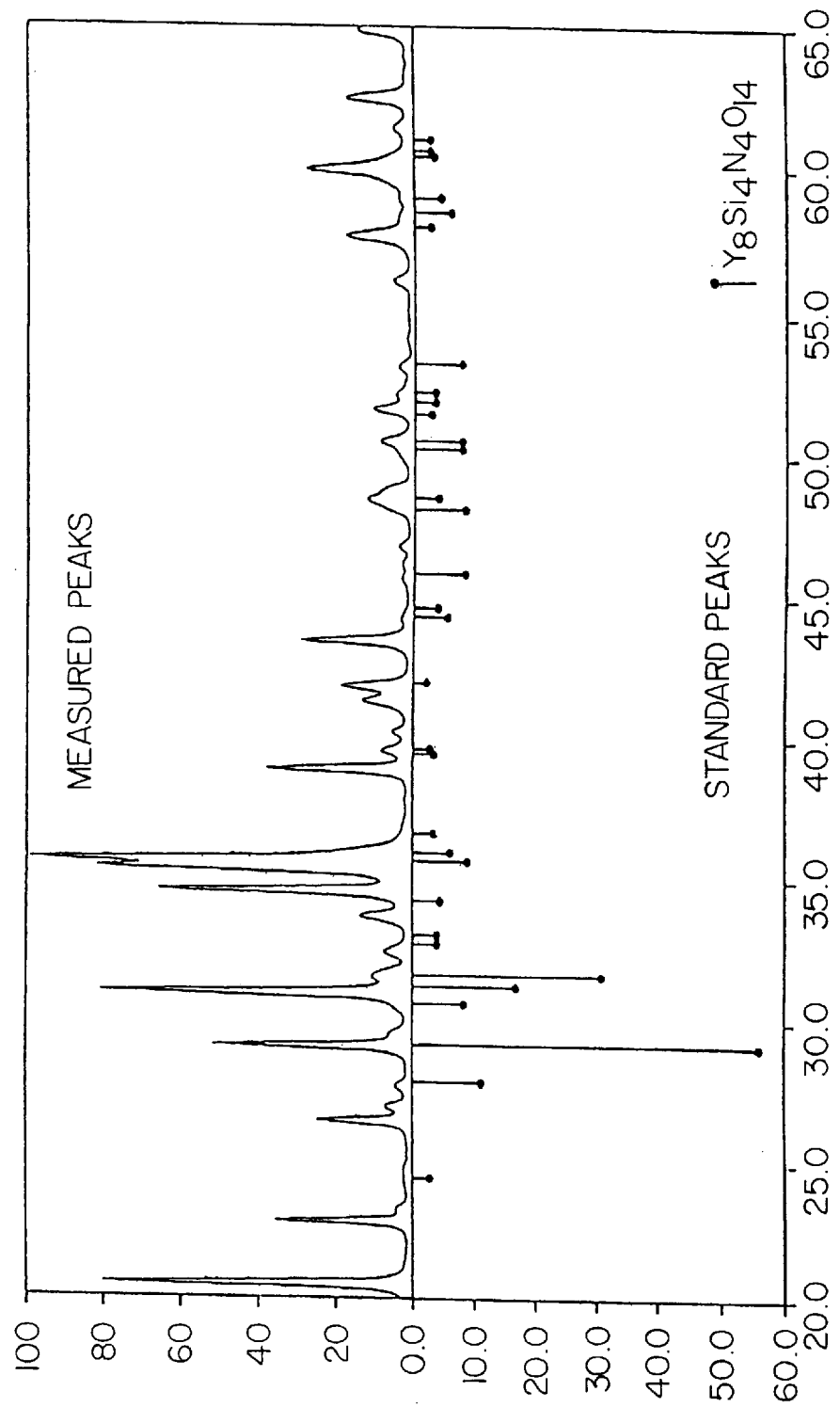
FIG. 8 is X-ray diffraction pattern of the ceramic composite particle produced in Example 5.

X-ray diffraction pattern of the ceramic composite particle thus produced is shown in FIG. 8. As seen from FIG. 8, the ceramic composite particle showed the peak based on $Y_8Si_4N_4O_{14}$ phase. This teaches that the sintering aid ($Y_2O_3$) reacted with silicon nitride to form the binder phase substantially comprising Y—Si—O—N.

As described above in detail, according to the present invention, the ceramic composite particle in which the fine ceramic particle phases, each comprising a ceramic primary particle, are bound together through the binder phase formed by a reaction between the sintering aid and the ceramic particle is provided. Since the fine ceramic particle phase has a very small particle size of 1 nm to 1 μm, the sintered body obtained from the ceramic composite particle has a very fine and homogeneous microstructure. Further, since the sintering aid reacts with the ceramic particle to form the binder phase, the sintering aid is uniformly dispersed throughout the ceramic composite particle. Therefore, the segregation of the sintering aid in the sintered body can be avoided.

In addition, since the average particle size of 0.1–120 μm of the ceramic composite particle is suitable in view of molding efficiency, an optimum injection molding compound or slip casting slurry can be prepared by using a relatively small amount of the organic binder or a dispersion medium. Thus, the ceramic composite particle of the present invention has a fine and homogeneous microstructure and a good moldability. Therefore, the sintered body made of the ceramic composite particle of the present invention also has a fine and homogeneous microstructure and excellent mechanical properties in room temperature strength, high temperature strength, hardness, toughness, thermal shock resistance, corrosion resistance, abrasion resistance, etc. Such a sintered body is suitably used as a structural member for high-temperature use such as gas turbine, automotive engine, etc., and a sliding member such as a rocker arm, etc.

What is claimed is:

1. A ceramic composite particle having an average particle size of 0.1–120 µm, which comprises a plurality of fine ceramic particle phases and a binder phase formed by a reaction between a fine particle of at least one ceramic material and a sintering aid, each of said fine ceramic particle phases comprising a fine primary particle of said at least one ceramic material and having a particle size in the range of 1 nm to 1 µm, and said fine ceramic particle phases being bound together through said binder phase.

2. The ceramic composite particle according to claim 1, wherein said ceramic material is at least one selected from the group consisting of silicon nitride, silicon carbide and titanium nitride.

3. The ceramic composite particle according to claim 1, wherein said sintering aid is (1) at least one of MgO and $Al_2O_3$, (2) at least one oxide selected from the group consisting of oxides of 3A Group elements and 4A Group elements of the Periodic Table, or (3) a mixture of aluminum nitride and said at least one oxide of (1) or (2).

4. The ceramic composite particle according to claim 2, wherein said sintering aid is (1) at least one oxide of MgO and $Al_2O_3$, (2) at least one oxide selected from the group consisting of oxides of 3A Group elements and 4A Group elements of the Periodic Table, or (3) a mixture of aluminum nitride and said at least one oxide of (1) or (2).

* * * * *